(12) United States Patent
Dias et al.

(10) Patent No.: US 11,315,014 B2
(45) Date of Patent: Apr. 26, 2022

(54) WORKFLOW OPTIMIZATION

(71) Applicant: EMC IP Holding Company LLC, Hopkinton, MA (US)

(72) Inventors: Jonas F. Dias, Rio de Janeiro (BR); Angelo Ciarlini, Rio de Janeiro (BR); Romulo D. Pinho, Niteroi (BR); Vinicius Gottin, Rio de Janeiro (BR); Andre Maximo, Rio de Janeiro (BR); Edward Pacheco, Rio de Janeiro (BR); David Holmes, Guildford (GB); Keshava Rangarajan, Sugar Land, TX (US); Scott David Senften, Sugar Land, TX (US); Joseph Blake Winston, Houston, TX (US); Xi Wang, Houston, TX (US); Clifton Brent Walker, Richmond, TX (US); Ashwani Dev, Katy, TX (US); Chandra Yeleshwarapu, Sugar Land, TX (US); Nagaraj Srinivasan, Sugar Land, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/998,728

(22) Filed: Aug. 16, 2018

(65) Prior Publication Data
US 2020/0057675 A1 Feb. 20, 2020

(51) Int. Cl.
*G06N 3/08* (2006.01)
*G06N 3/04* (2006.01)
(Continued)

(52) U.S. Cl.
CPC ................ *G06N 3/08* (2013.01); *G06F 9/48* (2013.01); *G06F 9/4843* (2013.01);
(Continued)

(58) Field of Classification Search
CPC . G06F 9/48; G06F 9/50; G06F 9/4843; G06F 9/4881; G06F 9/5061;
(Continued)

(56) References Cited

U.S. PATENT DOCUMENTS

| 10,013,656 B1 | 7/2018 | Ciarlini et al. |
| 2007/0005522 A1* | 1/2007 | Wren ..................... G06Q 10/06 706/13 |

(Continued)

FOREIGN PATENT DOCUMENTS

| CN | 106228314 A | 12/2016 |
| CN | 107292419 A | 10/2017 |

OTHER PUBLICATIONS

International Search Report and Written Opinion, PCT Application No. PCT/US2019/046714, dated Jan. 20, 2020.
(Continued)

*Primary Examiner* — Charles M Swift
(74) *Attorney, Agent, or Firm* — Polsinelli PC

(57) ABSTRACT

A computer implemented method, computer program product, and system for managing execution of a workflow comprising a set of subworkflows, comprising optimizing the set of subworkflows using a deep neural network, wherein each subworkflow of the set of subworkflows has a set of tasks, wherein each task of the sets of tasks has a requirement of resources of a set of resources; wherein each task of the sets of tasks is enabled to be dependent on another task of the sets of tasks, training the deep neural network by: executing the set of subworkflows, collecting provenance data from the execution, and collecting monitoring data that represents the state of said set of resources, wherein the training causes the neural network to learn relationships between the states of said set of resources, the said sets of tasks, their parameters and the obtained performance, optimizing an allocation of resources of the set of resources to
(Continued)

each task of the sets of tasks to ensure compliance with a user-defined quality metric based on the deep neural network output.

20 Claims, 10 Drawing Sheets

(51) Int. Cl.
  *G06N 3/02* (2006.01)
  *G06F 9/48* (2006.01)
  *G06F 9/50* (2006.01)

(52) U.S. Cl.
  CPC ............. *G06F 9/4881* (2013.01); *G06F 9/50* (2013.01); *G06F 9/5061* (2013.01); *G06F 9/5066* (2013.01); *G06F 9/5077* (2013.01); *G06F 9/5083* (2013.01); *G06N 3/02* (2013.01); *G06N 3/04* (2013.01); *G06N 3/086* (2013.01); *G06F 2209/501* (2013.01); *G06F 2209/5011* (2013.01); *G06F 2209/5019* (2013.01)

(58) Field of Classification Search
  CPC .... G06F 9/5066; G06F 9/5077; G06F 9/5083; G06F 2209/501; G06F 2209/5011; G06F 2209/5019; G06F 2209/5083; G06N 3/02; G06N 3/08; G06N 3/086

See application file for complete search history.

(56) References Cited

U.S. PATENT DOCUMENTS

| | | | | |
|---|---|---|---|---|
| 2007/0174101 | A1* | 7/2007 | Li | G06Q 10/06 705/7.26 |
| 2011/0138391 | A1* | 6/2011 | Cho | G06F 9/4881 718/102 |
| 2012/0030683 | A1* | 2/2012 | Kurdi | G06F 9/5072 718/104 |
| 2014/0289733 | A1* | 9/2014 | Fritz | G06F 9/5066 718/104 |
| 2014/0359624 | A1* | 12/2014 | Cherkasova | G06F 11/3404 718/100 |
| 2017/0093988 | A1* | 3/2017 | Rehaag | H04L 67/2842 |
| 2017/0286861 | A1* | 10/2017 | Kelly | G06N 3/08 |
| 2018/0018463 | A1* | 1/2018 | Grossman | H04L 63/1425 |
| 2018/0024859 | A1* | 1/2018 | Doshi | G06N 20/00 718/104 |
| 2018/0255122 | A1* | 9/2018 | Hu | G06F 9/445 |
| 2019/0171483 | A1* | 6/2019 | Santhar | G06F 9/4881 |

OTHER PUBLICATIONS

English Abstract of CN 107292419A; Retrieved from www.espacenet.com on Apr. 1, 2021.

English Abstract of CN 106228314A; Retrieved from www.espacenet.com on Apr. 1, 2021.

Sonja Hoo et al. 'On Specifying and Sharing Scientific Workflow Optimization Results Using Research Objects' In: Proceedings of the 8th Workshop on Workflows in support of Large-Scale Science, Association for Computing Machinery, 2013, pp. 28-37.

Srdjan Vukmirovic et al. 'Optimization of Workflow Scheduling in Utility Management System with Hierarchical Neural Network' International Journal of Computational Intelligence System Mar. 12, 2012, vol. 4.

* cited by examiner

WORKFLOW OPTIMIZATION

BACKGROUND

Business processes improvement is an important step towards increasing value in service offerings and product development. Business processes can be described as chains of activities, which are commonly known as workflows (Wf). Several of such activities represent a complete experimental process, which is often called a scientific workflow (SWf). Parts of the SWf may trigger computer programs or scripts that call a sequence of computer programs. In this sense, there are several sub-workflows inside the Wf, which descend all the way into the physical hardware. Representing processes as workflows is a well-known approach to make such processes reproducible and reliable. It also allows for keeping track of the produced assets and the provenance of such assets plus associated information about the submission and the execution of the workflow. However, many types of workflows exist at different levels of abstraction and are usually treated as distinct items.

After business processes are specified as workflows, the business processes are often optimized. In order to optimize the execution of a process, it is important to have a detailed understanding of the process. If the processes are interpreted as distinct, unreleated items, it is hard to achieve a global optimization, across workflows. For instance, consider that scientific workflows are optimized to achieve better quality, potentially making them more expensive (e.g., taking more time to complete their execution). When there is a sudden need to run a higher-level business workflow as fast as possible, the scientific workflows that are called by this business workflow might hinder the performance of the business workflow. Nevertheless, if the optimizer knows the business workflow with a finer granularity, it might be able to adjust execution parameters to achieve the higher-level goals.

Data provenance may be collected, describing the execution of the various workflow tasks and the corresponding dataflow with features of input and output data sets of each task. Based on the collected provenance data, local prediction models for each task may be created and global prediction models are generated based on their combination to enable the selection of the best alternatives for workflow execution.

As noted above, U.S. patent application Ser. No. 14/580,732, filed Dec. 23, 2014, entitled "Method and Apparatus for Analytical Processing of Provenance Data for HPC Workflow Optimization," incorporated by reference herein, addresses the need for a global optimization in which the input data sets to be treated are taken into account and the optimization goal can vary.

An issue associated with conventional workflow optimization is its dynamic adaptation. During the execution of a business process, the intermediary outcome may be different from what was originally predicted. Consequently, the decisions made by the optimizer will no longer be the best decisions. In this sense, the execution manager should find the new best execution plan and adapt the resources dynamically. To accomplish such a goal, the optimizer needs a prediction tool that gives accurate predictions for the outcome of the whole workflow, including the sub-workflows, at different execution steps.

Conventionally, a hierarchy of workflows is represented as a single directed acyclic graph (DAG). When a user submits a workflow to run, the system accesses the definition of the workflow and the sub-workflows of the workflow plus any other workflows on the system and flattens them into a single DAG that connects activities of the sub-workflows based on partial-order constraints. See, for example, [1] M. Codish et al., "Solving Partial Order Constraints for LPO Termination," Int'l Conf. on Rewriting Techniques and Applications, 4-18 (August 2006; Springer Berlin Heidelberg), incorporated by reference herein in its entirety.

A workflow can be defined at the business level, with references to several sub-workflows and scientific workflows, which will call computer programs at the operating system level and below in firmware and then hardware. A flattening process generates a flattened graph for the complete workflow, encompassing the activities of the process, from the business level to the operating system level. Prior to the execution of the workflow, the flattened graph contains the definition of the workflow, i.e., the information known a priori. The flattened graph includes the set of activities, relationships, scripts and input resources, such as parameters and input files, for the specific workflow. As the workflow runs, new information, such as obtained results and provenance data, is produced and collected. As the workflow progresses towards its completion, richer information with respect to execution of the workflow becomes available. Finally, the results are produced and quality metrics are computed and associated to the specific flattened graph.

Provenance data about the workflow execution can also include telemetry data about the execution obtained by monitoring the infrastructure, including, for instance, CPU (central processing unit) and memory usage at different points in time.

There is the possibility of executing various business workflows at the same time, sharing the same infrastructure. In this case, each business workflow corresponds to a different DAG, but the provenance data for a given business workflow includes data about its execution, telemetry data and data about the execution of the other workflows being executed at the same time as the given business workflow. This can be important, since the simultaneous execution of concurrent workflows may influence the final outcome of each workflow, and, in particular, their performance.

SUMMARY

A computer implemented method, computer program product, and system for managing execution of a workflow comprising a set of subworkflows, comprising optimizing the set of sub-workflows using a deep neural network, wherein each subworkflow of the set of sub-workflows has a set of tasks, wherein each task of the sets of tasks has a requirement of resources of a set of resources; wherein each task of the sets of tasks is enabled to be dependent on another task of the sets of tasks, training the deep neural network by: executing the set of subworkflows, collecting provenance data from the execution, and collecting monitoring data that represents the state of said set of resources, wherein the training causes the neural network to learn relationships between the states of said set of resources, the said sets of tasks, their parameters and the obtained performance, optimizing an allocation of resources of the set of resources to each task of the sets of tasks to ensure compliance with a user-defined quality metric based on the deep neural network output.

BRIEF DESCRIPTION OF THE DRAWINGS

FIG. 8 is an example of an embodiment of an apparatus that may utilize the techniques described herein, in accordance with an embodiment of the present disclosure; and FIG. 9 is an example of an embodiment of a method embodied on a computer readable storage medium that may utilize the techniques described herein, in accordance with an embodiment of the present invention.

DETAILED DESCRIPTION

Figure 1:
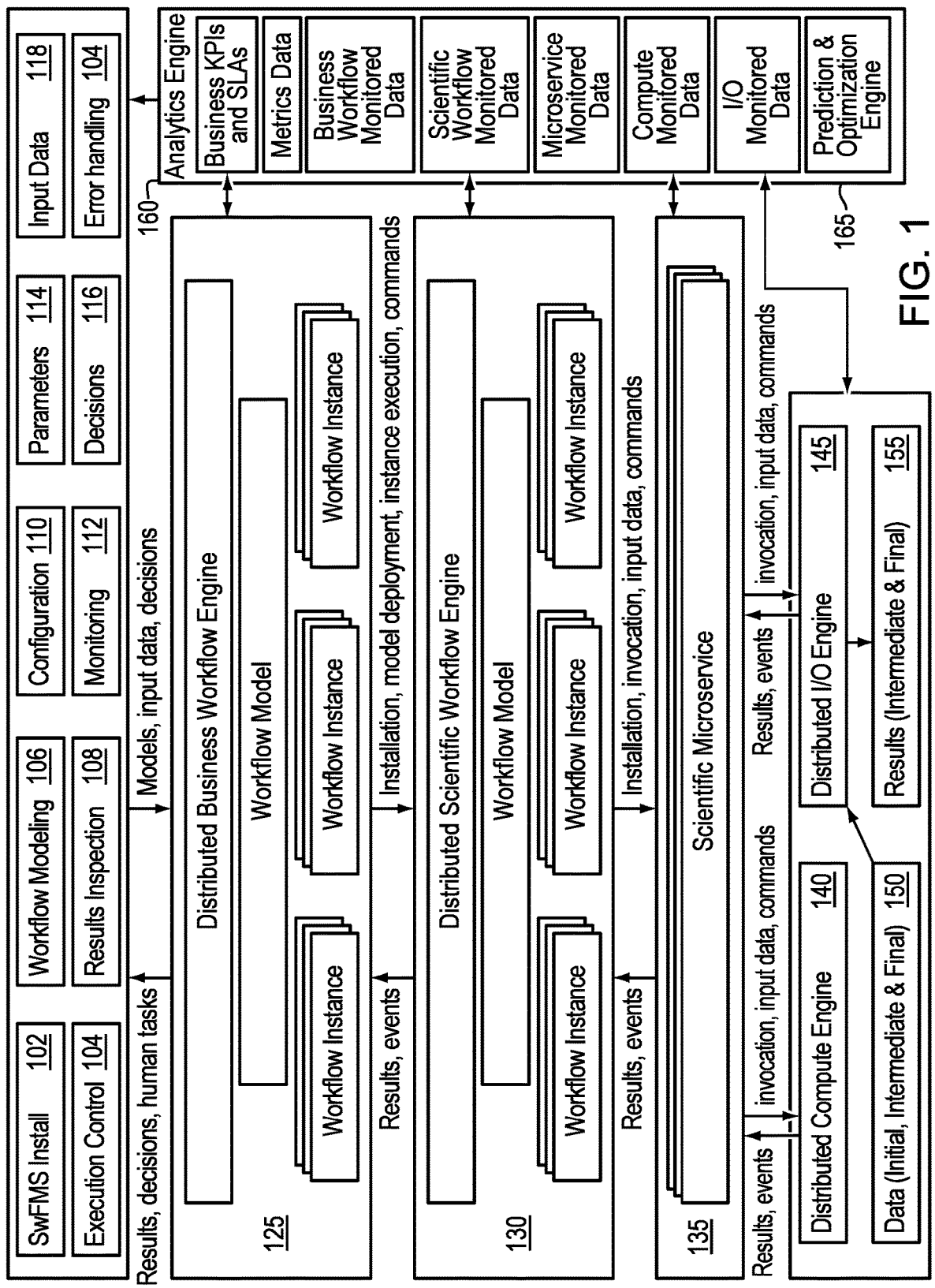
FIG. 1 is a simplified illustration of levels of orchestration within a system including business and scientific workflows, in accordance with an embodiment of the present disclosure.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure may provide methods and apparatus for managing execution of a workflow comprising one or more sub-workflows. One or more embodiments of the present disclosure employ snapshots of the distributed execution of workflows to train prediction models and improve workflow execution.

In many embodiments, interdependencies between workflows are discovered and accounted for optimization, otherwise an isolated optimization of a first workflow may impact a second workflow in a negative way. In most embodiments, workflows share resources and changing resource allocation from a first workflow may impact the performance of a second workflow. In further embodiments, the relationships among workflows, their resource allocation and their obtained performance (in terms of execution time, cost, quality of the results or other user-defined quality metric) are typically non-linear.

In some embodiments, provenance may refer to information collected during an execution of a workflow. In many embodiments, provenance may include input data, output data, and parameters. In certain embodiments, provenance may include information gathered including the person submitting the workflow, the other load on the system, the time of day, etc.

Thus, in some embodiments, the current disclosure may enable a software workflow management system that optimizes execution of workflows on distributed and elastic resources, such as clouds, according to one or more user-defined quality metrics or Cost restriction. In some embodiments, a user may demand a workflow to fully execute under a given number of hours. In certain embodiments, a user may demand the results to be accurate as long as the cost is under a given threshold. In many embodiments, user requirements with respect to the quality metrics may be established between the users and the service provider by means of Service Level Agreements (SLA). In certain embodiments, the disclosure may take into account the entire integrated system of a workflow from the low-level hardware resource utilization through the business workflows at the top of the software hierarchy. In many embodiments, the current disclosure may provide enhanced optimization of workflows. In certain embodiments, an optimizer may need information about a total system, which may include other workflows executing simultaneously that may have no bearing on any other workflow except they are consuming resources. In some embodiments, additional information may be gathered that might provide clues to usage patterns. In many embodiments, a person who submits a workflow may provide enough information to distinguish one workflow from another.

In certain embodiments, the current disclosure may use a neural network to optimize a workflow. In some embodiments, the current disclosure may use a deep neural network to optimize a workflow. In further embodiments, a neural network may discover relationships between variables in the workflow. In many embodiments, a neural network may be trained by repeatedly running a workflow, generating provenance data, and rerunning a workflow. In further embodiments, a genetic algorithm may be used to optimize a workflow. In certain embodiments, a genetic algorithm may be used in combination with a neural network to optimize workflows. In many embodiments, it may be beneficial to discover relationships between inputs to a workflow using a neural network as a human may not be able to discover relationships between inputs and the obtained performance of a workflow. In further embodiment, a genetic algorithm may enable discovery of how inputs may be used to optimize one or more workflows in a way that human may not be able to discover. Typically, a human may not be able to determine which relationships impact each other relationships. Generally, a human does not represent such a complex workflow in one's mind. Further, in many embodiments, representing the workflows described herein is a particular solution to a complex set of interdependencies. In some embodiments, the techniques described herein are unique to managing and optimizing the particular solution the problem described herein. In certain embodiments, a stochastic approach may be used for optimization. In further embodiments, other approaches and/or arbitrary heuristics may be used for optimization.

As noted herein, in many embodiments it may provide a benefit to optimize a workflow. In many embodiments, the current disclosure may provide an optimized set of techniques to optimize a workflow. In certain embodiments, workflow hierarchy may be flattened into a single directed acyclic graph (DAG), where the nodes may be applications or human tasks. Typically, an analytics engine models the entire state of the system taking into account the DAG, the monitored data and features extracted from input data and output data.

In certain embodiments, a model may map states of computation throughout of workflows execution to the obtained performance of the workflow with respect to the user-defined quality metrics. In some embodiments, when predicted quality metric is not satisfactory, the system may search for a new configuration of the cloud infrastructure that has higher chances to comply with the user-defined quality metric. In many embodiments, utilizing deep neural networks (DNN), a system may learn from multiple workflow executions and may adapt to particular execution patterns continuously updating the model, which may be used for workflow scheduling. In certain embodiment, patterns may be across an organization, across a data center, or a particular user.

In some embodiments, inputs to the workflow may be encoded as values into one or more chromosome and the inputs may be evaluated by a model. In certain embodiments, creating different chromosomes with distinct combination of input values may be used to evaluate the impact in the model when changing the input values. In many embodiments, a deep neural network may be used to evaluate the model of the workflow.

In certain embodiments, the current disclosure may describe a software workflow management system that optimizes the execution of workflows on distributed and elastic resources, such as clouds, according to user-defined quality metrics or Cost restriction. In many embodiments, the current disclosure may take into account an integrated system of a workflow from the low-level hardware resource utilization through the business workflows at the top of the software hierarchy. In most embodiments, system may learn from multiple workflow executions and adapt to particular execution patterns utilizing deep neural networks (DNN). In most embodiments, patterns may be across an organization, across a data center, or a particular user. Typical workflow optimization approaches utilize some variation of linear regression and heuristics in minimizing the cost of a single workflow execution on clouds. In some embodiments, stochastic techniques such as simulated annealing may be used. These methodologies are typically employed to model specific aspects of the workflow such as I/O or elapsed time. However, conventional techniques do not adapt to usage patterns that might vary over time, according to the underling hardware and according to the user.

In some embodiments, the current disclosure may address the need of taking into account a large set of features of the input datasets and the performance to be obtained with respect to the user-defined quality metrics, which might vary depending on the user's needs and might correspond to multi-objective optimization problems. In many embodiments, variables of these problems may have complex non-linear relationships, which are not considered by traditional modeling tools.

In many embodiments, the current disclosure may advance the art by enabling the creation of cohesive non-linear models across the entire integrated software and hardware stack. In some embodiments, such models may be continuously refined during the execution of the workflows, which may allow for dynamic optimizations at the global (top of the stack) and local (bottom of the stack) levels.

In application Ser. No. 14/580,732, a need of a global optimization by using a bottom-up approach in which local models of the tasks are composed to create a global model for the workflow was discussed. In the instant disclosure, direct creation of a global model for the workflows using DNNs may be created so that the model may capture interference among tasks more effectively, even when such interference is not obvious, and this approach may generate more accurate models.

In certain embodiments, a workflow may be composed of several abstract activities and each activity may unfold into one or more concrete tasks that may be executed using a set of resources. In some embodiments, given a resource pool, a set of tasks and a set of restrictions, workflow scheduling may specify which tasks of the workflow may run with which computing resources, respecting the dependencies between the different workflow tasks. In many embodiments, dependencies as described herein may be a specialization of the job shop problem, which is a NP-hard problem. In some embodiments, a solution to a business problem may be represented as a series of directed graphs.

In certain embodiments, levels of orchestration including description of a business process to utilizing the hardware subsystems, may be described, individually, with a graph structure. Conventionally each workflow management system applies its independent optimization on its local graph and typical systems were implemented as hierarchies of these local graphs.

In some embodiments, user-defined quality metrics and Cost restrictions may be set at the business workflow level, since that is the level users tend to more naturally interact with. In certain embodiments, a cost of a solution to a business problem is the complete execution of the entire hierarchy and any individual optimization of a single level in the hierarchy may ignore the ultimate goal. In many embodiments, a cost may be impacted by how tasks within a scientific workflows execute. In some embodiments, an inability of a task to use the amount of resources it requires may have a direct impact on the obtained performance and its cost. In certain embodiments, when optimizing a workflow execution, it may be important to model the relationships established at all workflow levels. In most embodiments, capturing such hierarchical relationships in a single model may be challenging. In further embodiments, to properly model dimensionality and critical relationships across this space a deep learning approach may be used.

In some embodiments, optimization of execution time and monetary costs for a single workflow run may be commonplace. However, in other embodiments, for a service provider with several users and workflows, with specific requirements, the cost function to be optimized can be very complex and hard to be defined analytically. In most embodiments, there may be many non-linear relationships associated to the features of the executions that may not be captured by heuristics and traditional modeling techniques, in particular taking into account that features of the data to be processed can vary dramatically and the user-defined goals usually lead to a multi-objective optimization problem.

In certain embodiments, during the execution of one or more workflows, the load of the execution platform may be likely to change constantly. In some embodiments, a resource pool may increase or decrease, a network may suffer with overloads and failures, and new demands may be submitted. In many embodiments, intermediary steps of a process may generate results very differently from what would be expected (i.e., what has been modelled). As a result, in certain embodiments, the performance obtained on the workflow executions may tend to be very non-deterministic. In almost all embodiments, a model for workflow optimization may need to be able to predict workflow behavior at various points in time.

In most embodiments, given the variations referred above, a model may need to capture time-dependent factors and the infrastructure itself may need to be ready to deal with such temporal changes and adapt the resources accordingly. In many embodiments, workflow scheduling on top of cloud infrastructures may add new elements to the problem because the resources are shared among the users by means of virtualization techniques. In some embodiments, characteristics may make resources allocation very dynamic since the resource pool might change (in size or computing power) during the execution. In some embodiments, the cost of a resource may change over time. In further embodiments, a cost of resource usage may be measured according to the type of the resource and to how much it was used (the pay-as-you-go model of the cloud).

In certain embodiments, a workflow may be represented as a graph where the vertices are the tasks and the edges are the dependencies between them. In most embodiments, in business workflows, tasks may be business-related processes, which may include human tasks and/or a complete execution of scientific workflows. In some embodiments, in scientific workflows, tasks may execute scientific applications to transform and analyze data. In certain embodiments, a task in a scientific workflow may be at the coarsest scale (e.g., an application or process) or at a level of finer granularity (e.g., a micro-service or maybe even a user-defined function).

In some embodiment, a model for optimized workflow scheduling may take into account business workflows, associated scientific workflows, and respective activities and actual tasks. In certain embodiments, a solution to modeling workflows may be a multi-objective problem and may require consideration of different aspects in order to satisfy the optimization constraints (e.g., maximize performance with respect to user-defined quality metrics and minimize costs). In some embodiments, optimization constraints may include one or more of different users competing for resources within the cloud/grid infra-structure, interdependencies among workflow activities, high communication cost due to the inter-dependencies between the activities (i.e. data needs to be transferred from one resource to another), and user perception of the scheduling approach.

In some embodiments, a workflow hierarchy to be optimized may be flattened into a single directed acyclic graph (DAG), where the nodes are either applications or human tasks. In some embodiments, an analytics engine may take into account types of monitored data and features extracted from input data and generated data to create a global model for the user-defined quality metrics. In some embodiments, this may result in a model that maps states of the computation throughout the execution to the obtained performance associated with the quality metrics. In further embodiments, when the predicted performance is not satisfactory, a model may search for a new configuration of the cloud infrastructure that has higher chances to comply with the goal of the user.

In certain embodiments, an analytics engine may be responsible for collecting execution metrics and provenance data from the workflow executions. In certain embodiments, an analytics engine may monitor and gather this data. In some embodiments, examples of specific instances of data include monitoring data from the compute nodes. In many embodiments, monitoring data may include CPU utilization, memory utilization, CPU time, user time, system time, and process time. In certain embodiments, data may include derived metrics. In many embodiments, derived metrics may include, scaling v. resource utilization (core, memory,) power usage, throughput v. wall time, latency v. throughput v. wall time, locality of compute v I/O. In some embodiment, data may include I/O data. In many embodiment, I/O data may include In+Out, network utilization, "chattiness," and time. In certain embodiments, data may include workflow data. In some embodiments, workflow data may include, execution model, activities, parameterization of the execution model and activities, type evaluation, time/activity v. time/workflow, path taken through a DAG. In some embodiments, data may include business process data. In many embodiment, business process data may include efficacy, % Failure (rework) v. success, Fast/Slow, and Expensive/Reasonable cost. In some embodiments, data may include data features. In certain embodiments, data features data may include metadata from input and output and metadata from intermediate results.

In some embodiments, using collected features, it may be necessary to find out how combination of the collected features is related to the obtained performance. In traditional approaches, this is one of the most challenging steps to create accurate models. In some embodiments of the current disclosure, a deep neural network (DNN) may be used to learn relevant relationships among the available features. In certain embodiments, an automatic learning process may be leveraged by a choice of a network topology that explores the hierarchical structure of workflows.

In some embodiments, input data may be collected from distributed resources and served to the Analytics Engine. In certain embodiments, a prediction component may clean input data and train a deep neural network (DNN). In many embodiments, training of a neural network may be done from the start, generating a new DNN, or incrementally, refining the weights and biases of a current DNN with new monitored data. In further embodiments, after the training of a DNN, accuracy of a network may be evaluated using a test dataset and, if the result is satisfactory, the predictor may be updated with the new model. In further embodiments, metrics may continue to be collected during production runs within a data center. In other embodiments, offline refinement of a model produce parameterization of workflows optimized to different user/client's data access and data flows.

In certain embodiments, it may be possible to represent a complete process of multiple workflows as a single DAG. In some embodiments, nodes of a graph may be activities, input data, output data, specific parameters, execution configuration or any other collected features. In some embodiments, descriptions of possible inputs and results may be collected; including possible additional features from input data, informed by users or by means of user defined functions. In many embodiments, data collection may occur alongside a DAG and variables in the DAG may be considered features to be captured. In certain embodiments, a workflow execution may be represented as a knowledge graph using W3C PROV-O recommendation. In a particular embodiment, edges in a graph may have associated semantics and may create a tensor of adjacencies to be the input of the deep neural network. In certain embodiments, tensor space may be sparse and it may be possible to create more compact tensors that capture the essence of a workflow execution and the dependencies between activities and data. In further embodiments, a knowledge map may be mapped to a tensor of adjacencies. In certain embodiments, a tensor may be used as an input for a DNN.

In some embodiments, snapshots in a graph may be points where the current state of computation may be captured. In certain embodiments, a state is the tensor representation of what has already been executed, the produced data, its associated features and their relationships. In some embodiments, a snapshot may be a structured representation of the monitored data captured so far from a workflow execution. In many embodiments, as a workflow progresses, more information may be added to a graph. In some embodiments, the more snapshots that are defined, the more information that may be available to train a model. In a particular embodiment, snapshots may be defined after a completion of each activity of a DAG. In certain embodiments, capturing too many snapshots during the workflow execution may impact negatively in the overall execution.

In some embodiments, for each snapshot, a tensor containing a state of workflow execution and allocated resources may be registered. In many embodiments, tensors of a workflow execution may be stored and may be associated with the obtained performance at an end of workflow execution with respect to a user-defined quality metric. Thus, in certain embodiments, a tensor for each snapshot may be ready for training at the end of a workflow execution.

In some embodiments, neurons of an input layer of a DNN may consume a tensor splitting data according to a DAG topology and the relationships between features. In certain embodiments, this may be important because features of the same activity or neighbor activities may form patterns of interest for the neural network. In many embodiments, a DNN may be incrementally trained after each workflow execution. In certain embodiments, for new ongoing workflow executions, based on a tensor that represents what has already been executed, a DNN may give an approximated prediction of the obtained performance. In certain embodiments, execution of a model may be re-evaluated at specific snapshots and, depending on the performance predicted by a DNN, a system may decide to change allocated resources.

In some embodiments, a DNN may allow for prediction of the performance of workflow executions based on the state of a computation. In certain embodiments, a DNN may not provide a straightforward means to rectify the current resource allocation state towards an optimal allocation parameterization.

In certain embodiments, an optimizer module may enable an optimal allocation parameterization. In a particular embodiment, there may be a current global state of computation, namely $S_2$. In this particular embodiment, an analytics engine records $S_2$ and uses it as input to search for new possible states. In this embodiment, the analytical engine generates several possible new states exploring available resources and the parameter space. In this embodiment, the analytical engine may consider new states with more or less resources, different scheduling, alternative algorithms, different data placement and alternative data partitioning strategies. In this embodiment, each possible new state is a candidate to replace $S_2$. In this embodiment, candidates are evaluated using the DNN that predicts the outcome if that state is considered. In this embodiment, the state that minimizes the cost function associated with the user-defined quality requirements is selected as the best state.

In some embodiments, when an execution manager receives a new best state from the analytics engine, it may evaluate if taking the execution to that new state is worth the computational effort to do so. In certain embodiments, an execution manager may decide to keep a current state and wait until it receives a new best state. In other embodiments, an execution manager may decide to change the state, which may require the creation of a new state or the setup to go to another known state. In some embodiments, state changes may affect tasks that have not already started.

In certain embodiments, if an execution manager is not able to change state due to an unexpected issue, it may report the failed attempt and waits for the next best state from the optimizer. In some embodiments, a current state of the computation may have changed from what the optimizer had interpreted as input. In certain embodiments, an execution manager may wait until it receives a next effective best state candidate.

In some embodiments, an optimizer may use a genetic algorithm (GA) to model the state of computation as a chromosome where each gene is a mapping between entities of the execution graph. In certain embodiments, a gene may map a task to a given compute resource or a task to a given algorithm. In many embodiments, chromosomes may have a direct relationship with inputs of an DNN, needing to be transformed into a structure able to be read into a DNN. In some embodiments, inputs may be represented as a tensor structure. In many embodiments, "quality" of chromosomes may be evaluated using a fitness function that employs the output of the DNN. In some embodiments, chromosomes that lead to a better performance with respect to the user-defined quality metrics may prevail and be recombined until an optimal solution is found.

In certain embodiments, an optimizer may use a DNN to model and solve the constraint satisfaction problem. In some embodiments, using DNN, features of the workflow and the current state of the system may be extracted to determine which of the predictions may generate the optimal run state of the submitted workflow along with the modifications to the currently executing workflows.

In certain embodiments, a DNN model may represent multiple workflow hierarchies in a single model. In many embodiments, from the high-level business workflow definition to the low-level infrastructure allocation and parameterization, a workflow execution may be presented as a single graph that is used as input to train a DNN. In some embodiments, a neural network may be designed to predict workflow performance given the current state of the computation, capturing important features of the workflow and input data, at different hierarchy levels. In certain embodiments, high-level features may cause an implicit interference on low-level attributes that is hard to capture on traditional modeling tools. In some embodiments, a choice of a specific implementation of an algorithm may require a data transfer between different specialized resources and will affect performance. In many embodiments, complex causality relationship may be automatically captured by the DNN as proposed in this disclosure. In some embodiments, capturing of causality relationships may provide chances to optimize the workflow execution from the lowest to the highest level of abstraction.

In certain embodiments, a DNN may learn complex non-linear relationships in data. In some embodiments, workflow optimization may be an NP-Hard problem. In some embodiments, a heuristic approach to modeling a solution may be biased by relationships in the data, measured or intuitive, known by the developer of the heuristic. In other embodiments, with nested hierarchies of DAGs across hundreds of workflows running on tens or hundreds of different systems, complex and non-linear relationships with the optimization of workflows may naturally arise. In most embodiments, nested hierarchies and non-linear relationships may tend to be easily missed in the implementation of a heuristic. In most embodiments, a deep neural network systems may be meant to capture very complex and non-linear relationships in the data, they may be a good choice to solve the optimization problem presented in this disclosure.

In some embodiments, an intelligent workflow scheduling process may automate complex analyses, improves application performance and reduces time required to obtain results. In certain embodiments, workflow schedulers with machine learning capabilities may play a crucial role in intelligently scheduling and allocating the given tasks to the available resources by considering their complex dependencies (modeled as a DAG), features of the data, as well as the performance required by the user.

In some embodiments, according to a current state of the computation, an analytics engine may search for alternative states and evaluates them using the DNN. In many embodiments, an analytics engine may select a best state according to an optimization algorithm and inform the execution manager, which may attempt to change the state in order to optimize the remainder of the execution.

Conventionally, many companies have developed a large variety of algorithms that tackle complex issues in the Oil & Gas industry segment. Typically, these algorithms were designed to work on robust servers, heavily equipped workstations or large-scale supercomputers. Additionally, such algorithms were conventionally part of workflows designed to automate relevant processes in that industry domain. In certain embodiments, such workflows may be moved to the cloud, where these algorithms can be offered as a service to a broader range of clients.

In some embodiments, to become a service provider, companies may deploy their software stack on hybrid clouds. In further embodiments, deployment to a cloud may need to support concurrent executions of many workflows from many different users using different sorts of scientific applications. In many embodiments, a service provider may need to guarantee the service level agreement for all the users without increasing its internal costs.

In further embodiments, the current disclosure may enable continual optimization of the execution of workflows, adjusting the infrastructure and higher-level parameters, which may provide a unique tool to support cloud platforms running many workflows as a service. In some embodiments, the current disclosure may enable the adjusting of allocated resources and execution parameters to maximize efficiency and minimize cost. In further embodiments, when a user decides to run a new workflow, the current disclosure may enable prediction of how a workflow will run and when it should finish. In further embodiments, users may adjust settings to obtain a performance according to their needs.

In many embodiments, the current disclosure may also support service offerings to improve the user experience in the cloud platform. In a particular embodiment, a user may setup a workflow to run in two days. In this embodiment, a platform may send the user an offer that, by a special price, would reduce the execution time by one day. In some embodiments, the current disclosure may enable an optimization system to predict that running that workflow on a different setting of machines and storage would have better performance. In some embodiments, if there are several workflow options to process and analyze a given dataset, an optimization system may predict a quality of the results for each workflow for that specific dataset. In some embodiments, this may give a user a better support to decide the most suitable workflow and settings for analysis.

Refer now to the example embodiments of FIG. 1. In FIG. 1, each level of orchestration shown in FIG. 1, starting with the description of the business process to utilizing the hardware subsystems, may be described, individually, with a graph structure. FIG. 1 illustrates how the main components of the platform to execute workflows interact. Users access the platform by means of a graphical user interface (GUI). They can submit and interact with business workflows, which are orchestrated by a business workflow engine. Activities of the business workflow can run a complete scientific workflow, which in turn runs several scientific applications, encapsulated as micro services, on distributed computing resources. Besides the computing power to run the workflows, data is read and written intensively through a distributed I/O engine.

Figure 2A:
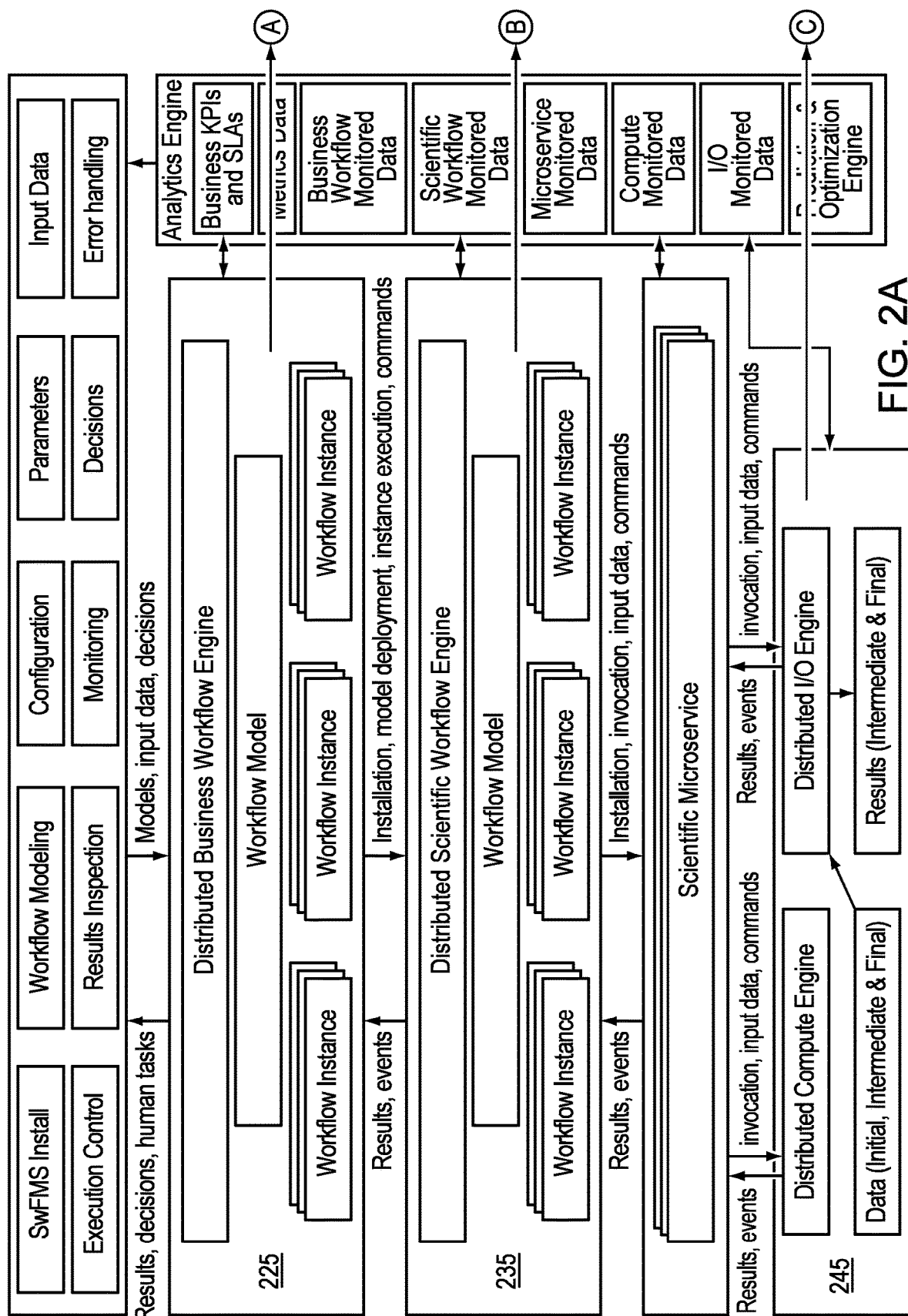
FIGS. 2A and 2B taken together are a simplified illustration of a mapping workflows into a DAG, in accordance with an embodiment of the present disclosure.
Figure 2B:
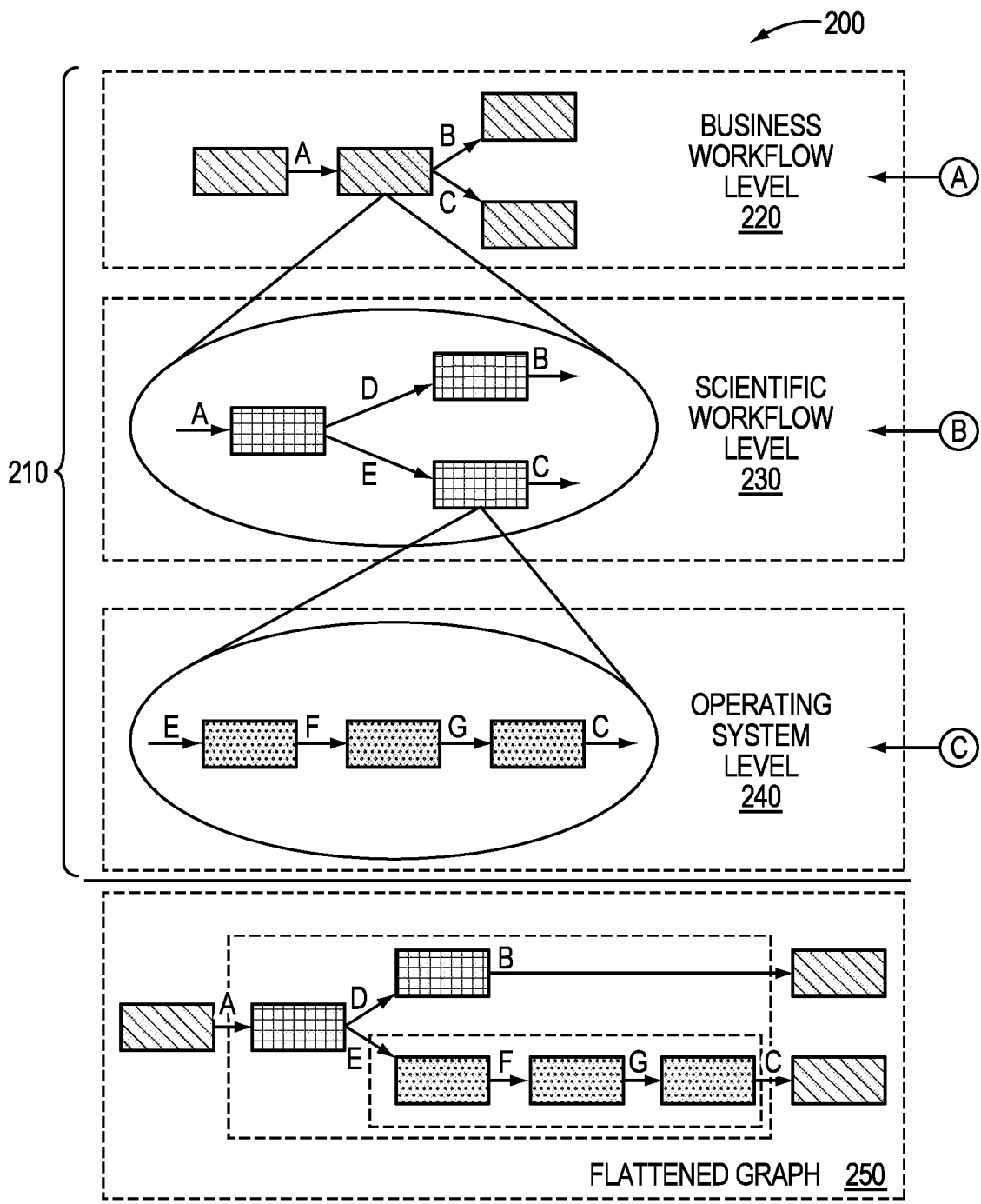

Refer now to the example embodiment of FIG. 2A and FIG. 2B, which illustrates how each level of orchestration may be mapped to a graph structure. Distributed Business workflow model and engine may be mapped to business workflow 220. Distributed Scientific workflow engine and workflow model 235 may be mapped to scientific workflow 230. Components of an operating system 245 may be mapped to operating system level 240. Graphs 220, 230, and 240 may be combined into graph 250. In FIG. 2A and FIG. 2B, additional workflows may be flattened and combined into an overall workflow. In other embodiments, additional graphs may be added and combined into a single graph.

Figure 3:
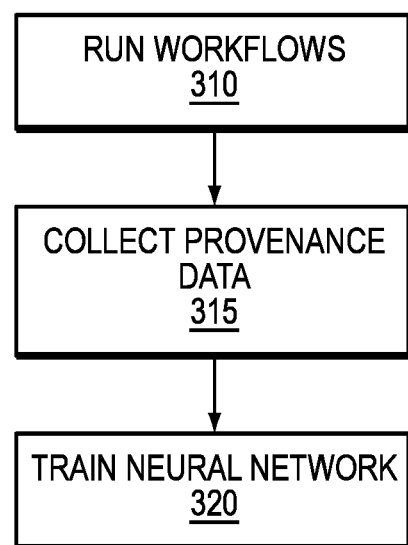
FIG. 3 is a simplified example of a method for training a neural network, in accordance with an embodiment of the present disclosure.
Figure 4:
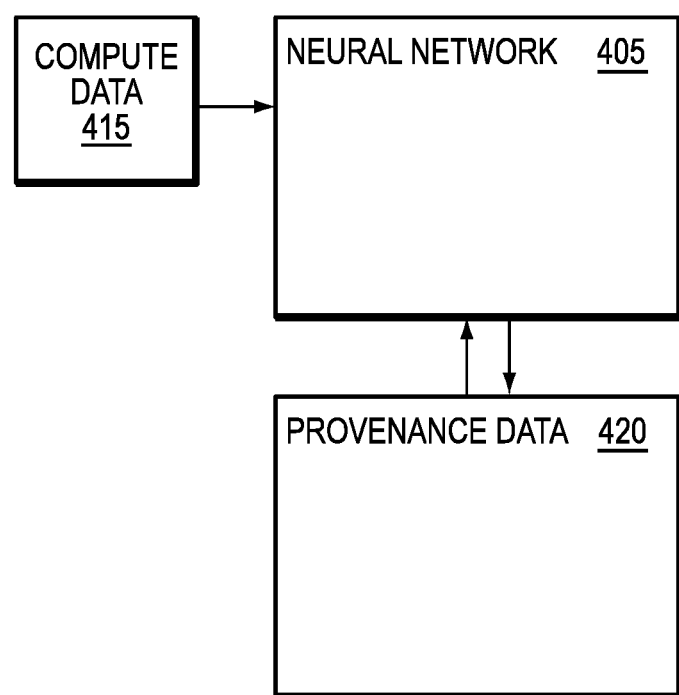
FIG. 4 is a simplified illustration of training a neural network, in accordance with an embodiment of the present disclosure.

Refer now to the example embodiment of FIGS. 3 and 4. The workflow management system runs the workflows (step 310) and collects the provenance data (step 315). Neural Network uses the provenance data and monitoring data from the compute nodes (such as CPU utilization, memory utilization, CPU time, user time, system time, and process time) and other derived metrics to train itself (step 320). In many embodiment, this process, such as steps 310 and 320, may repeat to train the Neural Network.

Figure 5:
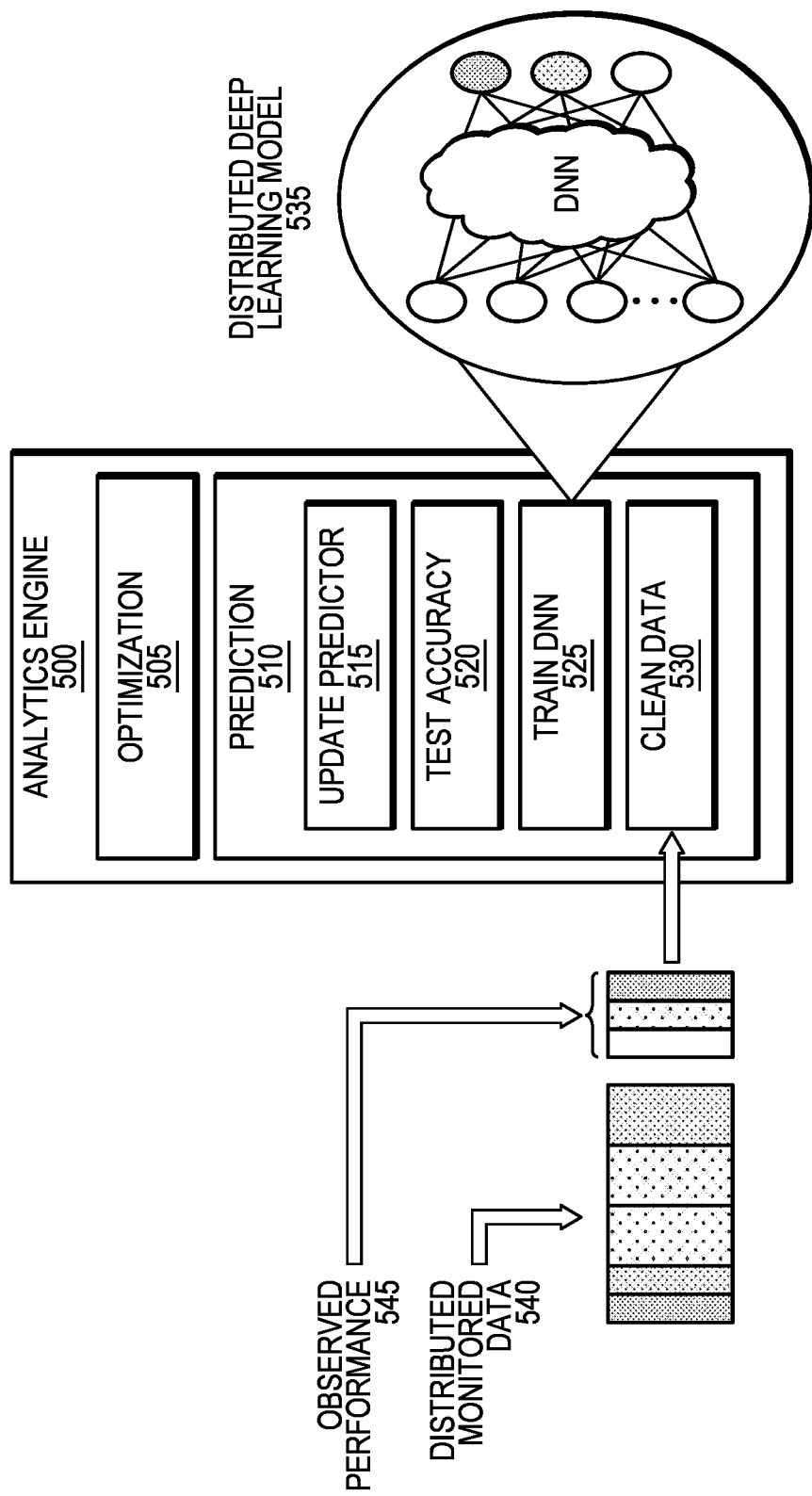
FIG. 5 is a simplified illustration on an analytics engine, in accordance with an embodiment of the present disclosure.

FIG. 5 shows an alternative embodiment of a learning process. Analytics engine 500 has optimization 505 and prediction 510 components. The Prediction 510 component is responsible to clean data 530, train deep neural network 525, test model accuracy 520 and update predictor 515. The Prediction 510 generates a distributed deep learning model 535. Distributed monitored data 540 and observed performance 545 is fed into clean data 530 of prediction 510 in analytics engine 500. In many embodiments, analytics engine 500 may represent "Prediction & Optimization Engine" component of FIG. 1. In this embodiment, data is collected from distributed resources, such as those in FIGS. 1 and 2, and served to Analytics Engine 500. Prediction component 510 cleans the input data and train DNN 535. In certain embodiments, training may be done from the start, generating a new DNN. In other embodiments, training may be performed incrementally, refining the weights and biases of the current DNN with new monitored data. Referring back to FIG. 5, after the training, the accuracy of network 535 is evaluated using a test dataset. Also in FIG. 5, if the result is satisfactory, the predictor is updated with the new model. In most embodiments, additional metrics may be to be collected during production runs within a data center. In further embodiments, offline refinement of the model may produce parameterization of workflows optimized to different user/client's data access and data flows.

Figure 6:
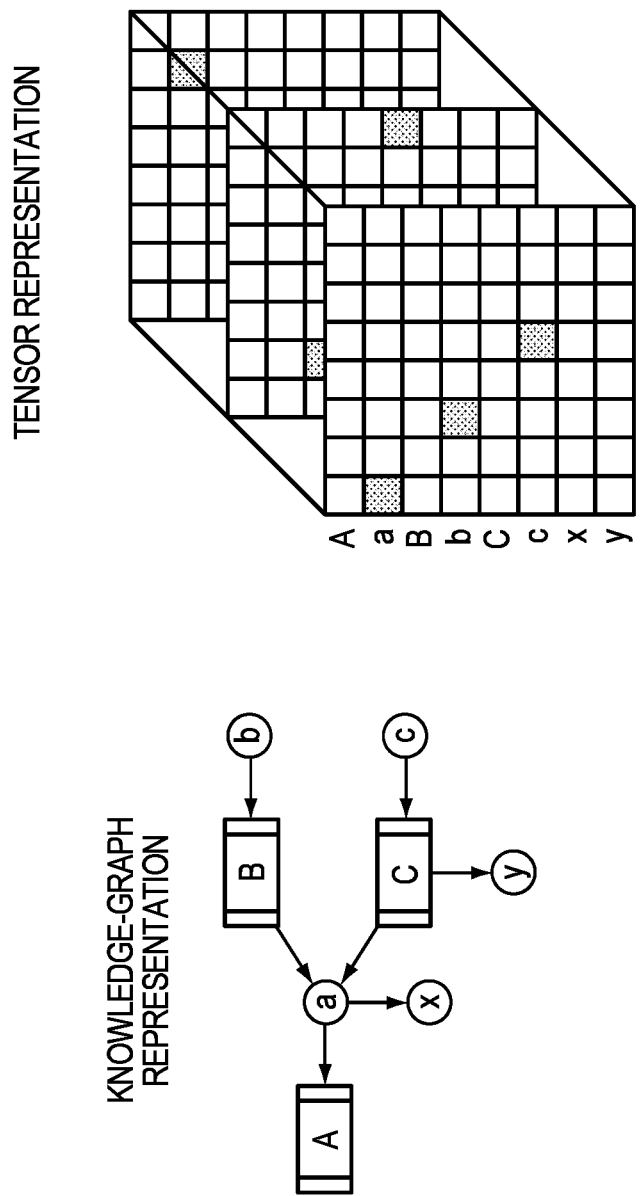
FIG. 6 is a simplified illustration of changing a knowledge graph representation into a tensor representation, in accordance with an embodiment of the present disclosure.

Refer now to the example embodiment of FIG. 6, which illustrates an example of how a knowledge graph can be mapped to a tensor of adjacencies. In many embodiments, a knowledge graph may model information in the form of entities and relationships between them. In certain embodiments, the tensors may be used as input for a DNN.

Figure 7:
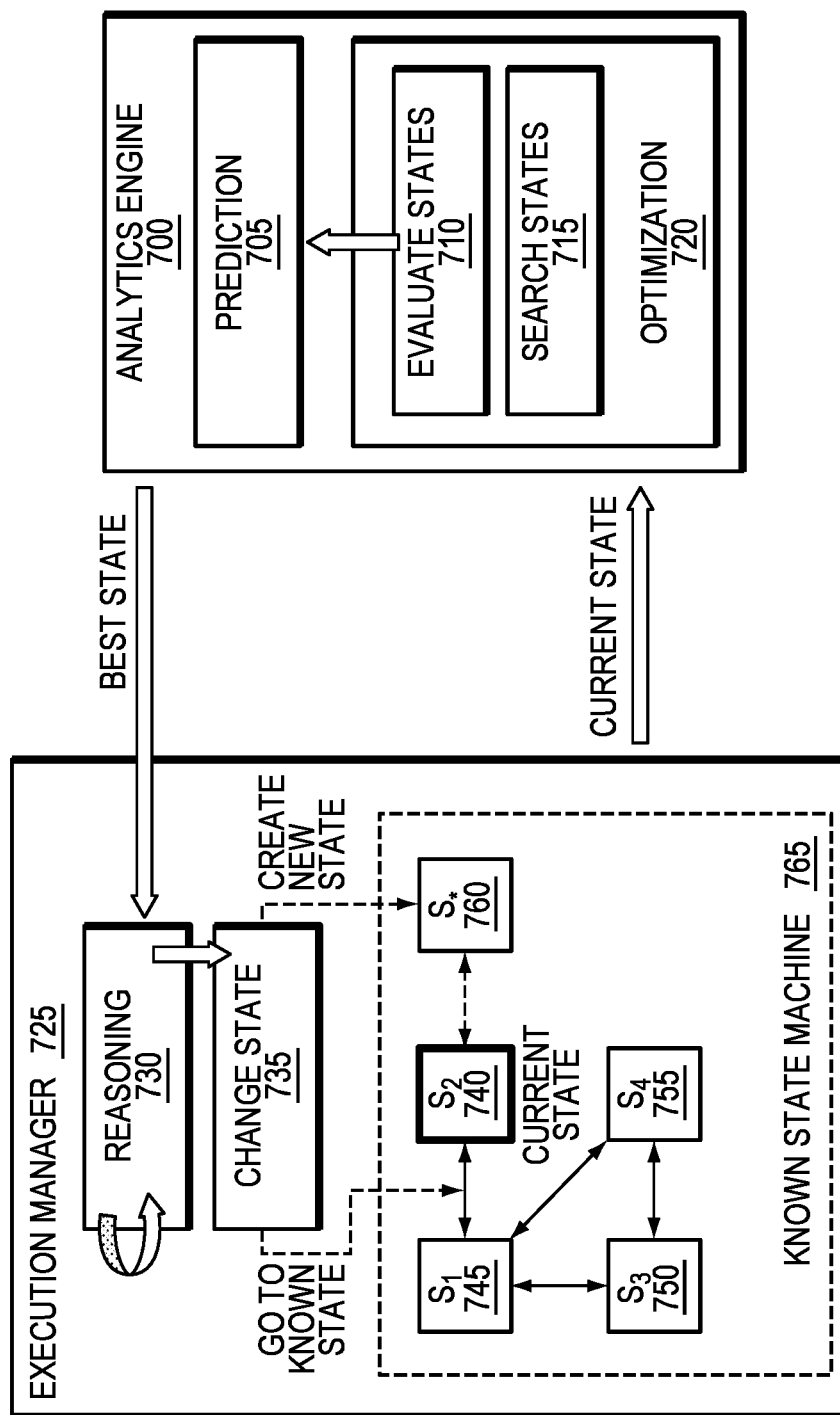
FIG. 7 is a simplified illustration of an execution manager interacting with an analytics engine, in accordance with an embodiment of the present disclosure.

Refer now to the example embodiment of FIG. 7, which illustrates optimizing a global workflow. In the example embodiment of FIG. 7, Analytics Engine 700 has prediction 700 and optimization 720. Optimization 720 evaluates states 710 and search states 715. Execution manager 725 has reasoning 730, change state 735, and known state machine 765. Known state machine has state S2, 740, State S1 745, State S3 750, State S4 755, and State S* 760. In this embodiment, there is a current global state of the computation, S2 740. Analytics engine 700 records S2 740 and uses it as input to search for new possible states. Execution Manager 725 generates several possible new states exploring available resources and the parameter space. Execution Manager 725 may consider new states with more or less resources, different scheduling, alternative algorithms, different data placement and alternative data partitioning strategies. Each possible new state is a candidate to replace S2 740. Candidates are evaluated using a DNN that predicts the outcome if that state is considered. The state that minimizes the cost function associated with the user-defined quality metrics requirements is selected as the best state.

When execution manager 725 receives a new best state from analytics engine 700, it evaluates if taking the execution to that new state is worth the computational effort to do so. This occurs in the reasoning stage 730. Execution manager 725 can decide to keep the current state and wait until it receives a new best state. Alternatively, execution may decide to change the state, which may require the creation of a new state or the setup to go to another known state.

In certain embodiments, an optimizer may use a genetic algorithm (GA) to model the state of computation as a chromosome where each gene is a mapping between entities of the execution graph. In some embodiments, a gene may map a task to a given compute resource or a task to a given algorithm. In many embodiments, a chromosome may have a direct relationship with the inputs of the DNN, needing to be transformed into the tensor structure described above. In certain embodiments, a "quality" of the chromosomes is evaluated using a fitness function that employs the output of the DNN. In many embodiments, chromosomes that lead to better QoS may then prevail and be recombined until an optimal solution is found.

In further embodiments, an optimizer may use a DNN model to solve a constraint satisfaction problem (CSP). In certain embodiments, using a DNN, features of the workflow and the current state of the system may be extracted to determine which of the predictions may generate the optimal run state of the submitted workflow along with the modifications to the currently executing workflows.

Figure 8:
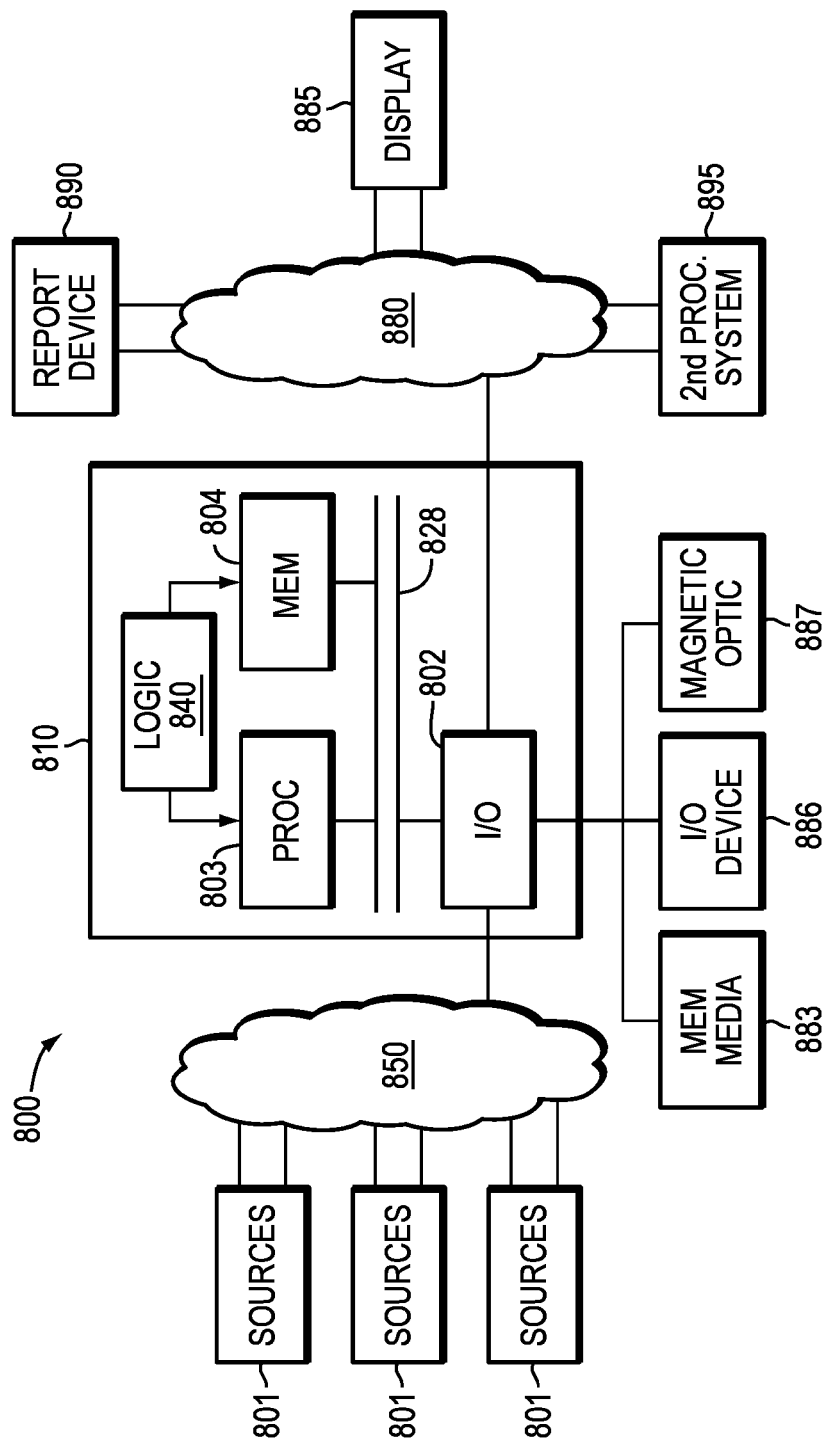
FIG. 8 is a simplified illustration representing a sample topology of a cloud with multiple clusters, in accordance with an embodiment of the present disclosure.
Figure 9:
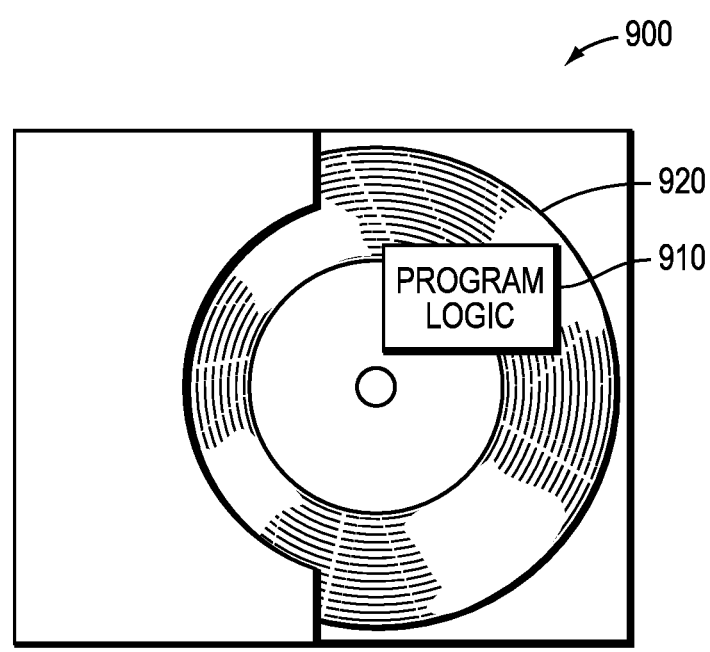
FIG. 9 is a simplified illustration representing sample mappings between clusters and clouds, in accordance with an embodiment of the present disclosure.

The methods and apparatus of this disclosure may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the disclosure. When implemented on one or more general-purpose processors, the program code combines with such a processor 803 to provide a unique apparatus that operates analogously to specific logic circuits. As such a general purpose digital machine can be transformed into a special purpose digital machine. FIG. 9 shows Program Logic 910 embodied on a computer-readable medium 920 as shown, and wherein the Logic is encoded in computer-executable code configured for carrying out the reservation service process of this disclosure and thereby forming a Computer Program Product 900. The logic 910 may be the same logic 840 on memory 804 loaded on processor 803. The program logic may also be embodied in software modules, as modules, or as hardware modules. A processor may be a virtual processor or a physical processor. Logic may be distributed across several processors or virtual processors to execute the logic. A storage medium may be a physical or logical device. A storage medium may consist of physical or logical devices. A storage medium may be mapped across multiple physical and/or logical devices. A storage medium may exist in a virtualized environment.

The logic for carrying out the method may be embodied as part of the system described below, which is useful for carrying out a method described with reference to embodiments shown in, for example, FIG. 3. For purposes of illustrating the present disclosure, the disclosure is described as embodied in a specific configuration and using special logical arrangements, but one skilled in the art will appreciate that the device is not limited to the specific configuration but rather only by the claims included with this specification.

Although the foregoing disclosure has been described in some detail for purposes of clarity of understanding, it will be apparent that certain changes and modifications may be practiced within the scope of the appended claims. Accordingly, the present implementations are to be considered as illustrative and not restrictive, and the disclosure is not to be limited to the details given herein, but may be modified within the scope and equivalents of the appended claims.

What is claimed is:

1. A computer implemented method for managing execution of a workflow comprising a set of subworkflows, the method comprising:
    optimizing the set of subworkflows using a deep neural network; wherein each subworkflow of the set of subworkflows has a set of tasks; wherein each task of the sets of tasks has a requirement of resources of a set of resources; wherein each task of the sets of tasks is enabled to be dependent on another task of the sets of tasks;
    training the deep neural network by: executing the set of subworkflows, collecting provenance data from the execution, and collecting monitoring data that represents a state of the set of resources; wherein the training causes the neural network to learn relationships between the states of the set of resources, the sets of tasks, their parameters and an obtained performance, and wherein the relationships between the states of the set of resources, the sets of tasks, their parameters, and the obtained performance are non-linear; and
    optimizing an allocation of resources of the set of resources to each task of the sets of tasks to ensure compliance with a user-defined quality metric based on output of the deep neural network, wherein the optimization further comprises creating at least one non-linear model based on the relationships between the states of the set of resources, the sets of tasks, their parameters, and the obtained performance.

2. The method of claim 1 further comprising:
    using the optimized allocation of resources to encode a set of chromosomes;
    using a Genetic Algorithm, running the set of chromosomes through the deep neural network to determine a new allocation of resources;
    determining if the new allocation of resources better complies with a quality of services; and
    implementing the new allocation of resources if it does better comply with the quality of services.

3. The method of claim 2 wherein the set of resources includes hardware resources and wherein an amount of hardware resources is enabled to change over execution of the workflows.

4. The method of claim 2 wherein the workflow is represented by a directed acyclic graph.

5. The method of claim 4 wherein inputs for the deep neural network are translated into a tensor representation.

6. A computer program product for managing execution of a workflow comprising a set of subworkflows, the computer program product comprising:
a non-transitory computer readable medium encoded with computer executable program code, the code configured to enable the execution of:
optimizing the set of subworkflows using a deep neural network; wherein each subworkflow of the set of subworkflows has a set of tasks; wherein each task of the sets of tasks has a requirement of resources of a set of resources; wherein each task of the sets of tasks is enabled to be dependent on another task of the sets of tasks;
training the deep neural network by: executing the set of subworkflows, collecting provenance data from the execution, and collecting monitoring data that represents a state of the set of resources; wherein the training causes the neural network to learn relationships between the states of the set of resources, the sets of tasks, their parameters and an obtained performance, and wherein the relationships between the states of the set of resources, the sets of tasks, their parameters, and the obtained performance are non-linear; and
optimizing an allocation of resources of the set of resources to each task of the sets of tasks to ensure compliance with a user-defined quality metric based on output of the deep neural network, wherein the optimization further comprises creating at least one non-linear model based on the relationships between the states of the set of resources, the sets of tasks, their parameters, and the obtained performance.

7. The computer program product of claim 6 the code further configured for:
using the optimized allocation of resources to encode a set of chromosomes;
using a Genetic Algorithm, running the set of chromosomes through the deep neural network to determine a new allocation of resources;
determining if the new allocation of resources better complies with a quality of services; and
implementing the new allocation of resources if it does better comply with the quality of services.

8. The computer program product of claim 7 wherein a set of resources includes hardware resources and wherein an amount of hardware resources is enabled to change over execution of the workflows.

9. The computer program product of claim 7 wherein the workflow is represented by a directed acyclic graph.

10. The computer program product of claim 9 wherein inputs for the deep neural network are translated into a tensor representation.

11. A system for managing execution of a workflow comprising a set of subworkflows, the system comprising:
one or more processors; and
computer executable program code, the code configured to enable the execution across the one or more processors of:
optimizing the set of subworkflows using a deep neural network; wherein each subworkflow of the set of subworkflows has a set of tasks; wherein each task of the sets of tasks has a requirement of resources of a set of resources; wherein each task of the sets of tasks is enabled to be dependent on another task of the sets of tasks;
training the deep neural network by: executing the set of subworkflows, collecting provenance data from the execution, and collecting monitoring data that represents a state of the set of resources; wherein the training causes the neural network to learn relationships between the states of the set of resources, the sets of tasks, their parameters and an obtained performance, and wherein the relationships between the states of the set of resources, the sets of tasks, their parameters, and the obtained performance are non-linear; and
optimizing an allocation of resources of the set of resources to each task of the sets of tasks to ensure compliance with a user-defined quality metric based on output of the deep neural network, wherein the optimization further comprises creating at least one non-linear model based on the relationships between the states of the set of resources, the sets of tasks, their parameters, and the obtained performance.

12. The system of claim 11 the computer executable program code further enabling the execution of:
using the optimized allocation of resources to encode a set of chromosomes;
using a Genetic Algorithm, running the set of chromosomes through the deep neural network to determine a new allocation of resources;
determining if the new allocation of resources better complies with the a quality of services; and
implementing the new allocation of resources if it does better comply with the quality of services.

13. The system of claim 12 wherein the set of resources includes hardware resources and wherein the amount of hardware resources is enabled to change over execution of the workflows.

14. The system of claim 12 wherein the workflow is represented by a directed acyclic graph.

15. The system of claim 14 wherein inputs for the deep neural network are translated into a tensor representation.

16. A computer implemented method, comprising:
optimizing a workflow hierarchy using a deep neural network, wherein the workflow hierarchy comprises at least one workflow having a corresponding set of subworkflows; wherein each subworkflow of the set of subworkflows has a set of tasks; wherein each task of the sets of tasks has a requirement of resources of a set of resources; wherein each task of the sets of tasks is enabled to be dependent on another task of the sets of tasks;
training the deep neural network by: executing the set of subworkflows, collecting provenance data from the execution, and collecting monitoring data that represents a state of the set of resources; wherein the training causes the neural network to learn relationships between the states of the set of resources, the sets of tasks, their parameters and an obtained performance, and wherein the relationships between the states of the set of resources, the sets of tasks, their parameters, and the obtained performance are non-linear; and
optimizing an allocation of resources of the set of resources to each task of the sets of tasks to ensure compliance with a user-defined quality metric based on output of the deep neural network, wherein the optimization further comprises creating at least one non-linear model based on the relationships between the states of the set of resources, the sets of tasks, their parameters, and the obtained performance.

17. The method of claim 16 further comprising:
using the optimized allocation of resources to encode a set of chromosomes;
using a Genetic Algorithm, running the set of chromosomes through the deep neural network to determine a new allocation of resources;
determining if the new allocation of resources better complies with a quality of services; and
implementing the new allocation of resources if it does better comply with the quality of services.

18. The method of claim 17 wherein the set of resources includes hardware resources and wherein an amount of hardware resources is enabled to change over execution of the workflows.

19. The method of claim 17 wherein the workflow is represented by a directed acyclic graph.

20. The method of claim 19 wherein inputs for the deep neural network are translated into a tensor representation.

\* \* \* \* \*